United States Patent [19]

Iwai

[11] Patent Number: 5,029,078
[45] Date of Patent: Jul. 2, 1991

[54] PROGRAM LOADING METHOD WITH RELOCATION ADDRESS

[75] Inventor: Ryo Iwai, Kamakurashi, Japan

[73] Assignee: Mitsubishi Denki K.K., Tokyo, Japan

[21] Appl. No.: 206,827

[22] Filed: Jun. 15, 1988

[30] Foreign Application Priority Data

Jun. 22, 1987 [JP] Japan ................................ 62-154854

[51] Int. Cl.$^5$ .......................... G06F 9/44; G06F 12/16
[52] U.S. Cl. .................................. 364/200; 364/246.3; 364/245.2
[58] Field of Search ... 364/200 MS File, 900 MS File

[56] References Cited

U.S. PATENT DOCUMENTS 4,403,283  9/1983  Myntti et al. .................... 364/200
4,511,964  4/1985  Georg et al. ..................... 364/200

FOREIGN PATENT DOCUMENTS 0195823  10/1986  European Pat. Off. .
1465861   3/1977  United Kingdom .

OTHER PUBLICATIONS

"Multi16 MD-DOS TM Programming Handbook", published by Mitsubishi Denki K.K. on Apr. 20, 1984, pp. 252-253.
D. C. Tsichritzis and P. A. Bernstein, Operating Systems, 1974, pp. 69-83.

Primary Examiner—Lawrence E. Anderson
Attorney, Agent, or Firm—Kanesaka & Takeuchi

[57] ABSTRACT

A relocator (4a) is appended to an executable program (4) for checking program information and the size of a memory area in the memory (25). This program (4) is then stored in the file storage unit (1) as a file. When the user starts the CPU (24) with the keyboard (27), the file is stored in the memory (25) as a program. Where another executable program (9) is stored in the memory (25) at the fixed address under these conditions, the relocator-appended executable program (4) is relocated and restored at the address which is specified by the information of the relocator (4a) and, then, the other executable program (9) is stored in the fixed address.

8 Claims, 11 Drawing Sheets

(a)
RELOCATOR TABLE

| START ADDRESS INFORMATION TABLE |
| --- |
| START ADDRESS FLAG TABLE |
| START ADDRESS TABLE |
| MEMORY MAX VALUE TABLE |
| BASE ADDRESS TABLE |
| PROGRAM SIZE TABLE |
| RELOCATE ITEM NO. TABLE |
| PROGRAM BODY TOP ADDRESS TABLE |
| PROGRAM STACK ADDRESS TABLE |
| PROGRAM EXCUTION START ADDRESS TABLE |
| ERROR MESSAGE CHARACTER STRING TABLE |

~34

(b)
REGISTERS AVAILABLE TO CPU

| POINTER REGISTER |
| --- |
| SECOND POINTER REGISTER |
| DATA REGISTER |
| COUNTER REGISTER |
| STACK REGISTER |
| FLAG REGISTER (CARRY FLAG) |

~35

(c)

ⓐ CONVERT PROGRAM PAGE SIZE INTO ACTUAL MEMORY SIZE AND STORE IT IN RELOCATOR PROGRAM SIZE TABLE
ⓑ RELOCATOR ITEM NO.
ⓒ ADD RELOCATOR BASE ADDRESS TABLE VALUE TO PROGRAM HEADER SIZE AND STORE IT IN PROGRAM BODY TOP ADDRESS TABLE
ⓓ PROGRAM BODY STACK ADDRESS
ⓔ PROGRAM BODY EXECUTION START ADDRESS

PROGRAM LOADING METHOD WITH RELOCATION ADDRESS

BACKGROUND OF THE INVENTION

The present invention relates to a program starting system by which an executable program is relocated in the memory of a computer system so that another executable program may be located at the fixed address.

Figure 14:
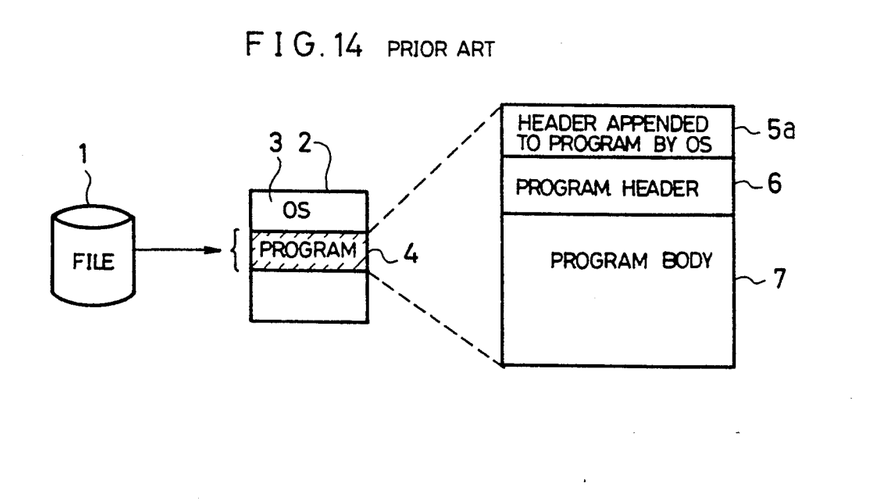
FIG. 14 is a block diagram showing a conventional program starting system.

FIG. 14 shows a commonly used, conventional program starting system which includes a file storage unit 1 for storing programs as files. A memory map 2 displays an operating system (OS) 3 and an executable program 4 which is operable in the operating system 3. The executable program 4 consists of a program body 7, a program header 6 prepared at the time of linking for storing relocation information and an execution starting address of the program body 7, and a header 5a, which is appended by the operating system 3 when the executable program is loaded in the memory, to contain the execution environment information to be transferred to the executable program or a parameter character string input by the user.

Figure 13:
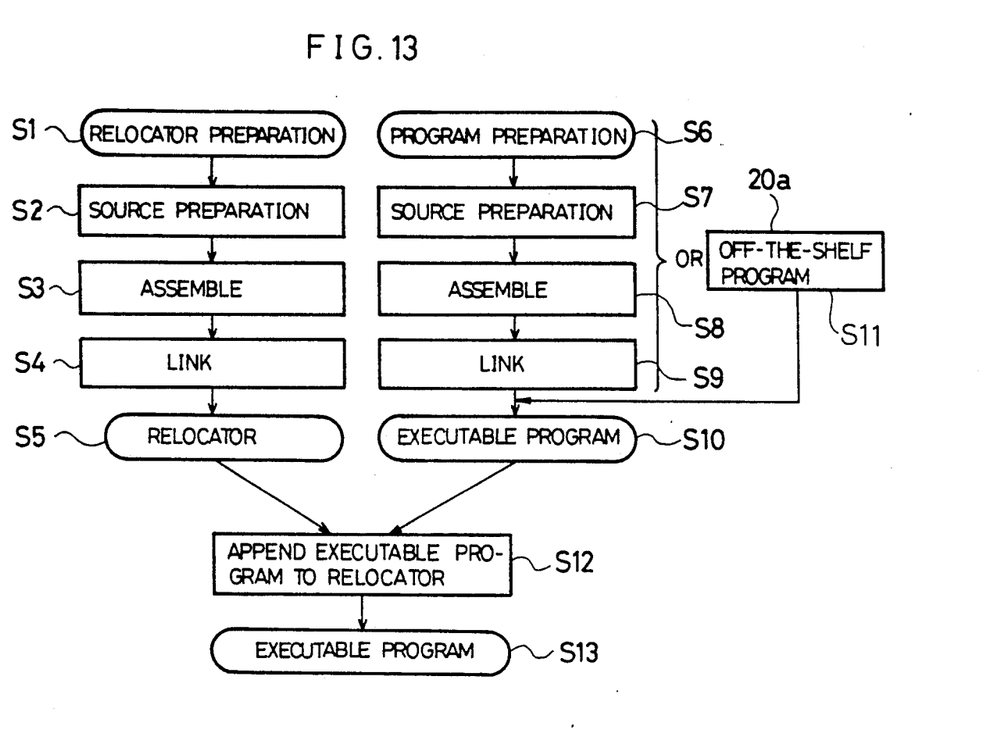
FIG. 13 is a flowchart showing a program preparation procedure according to the prior art and the above embodiment.

A commonly used program developing procedure is shown in the steps S6 through S10 of a flowchart in FIG. 13.

Figure 4:
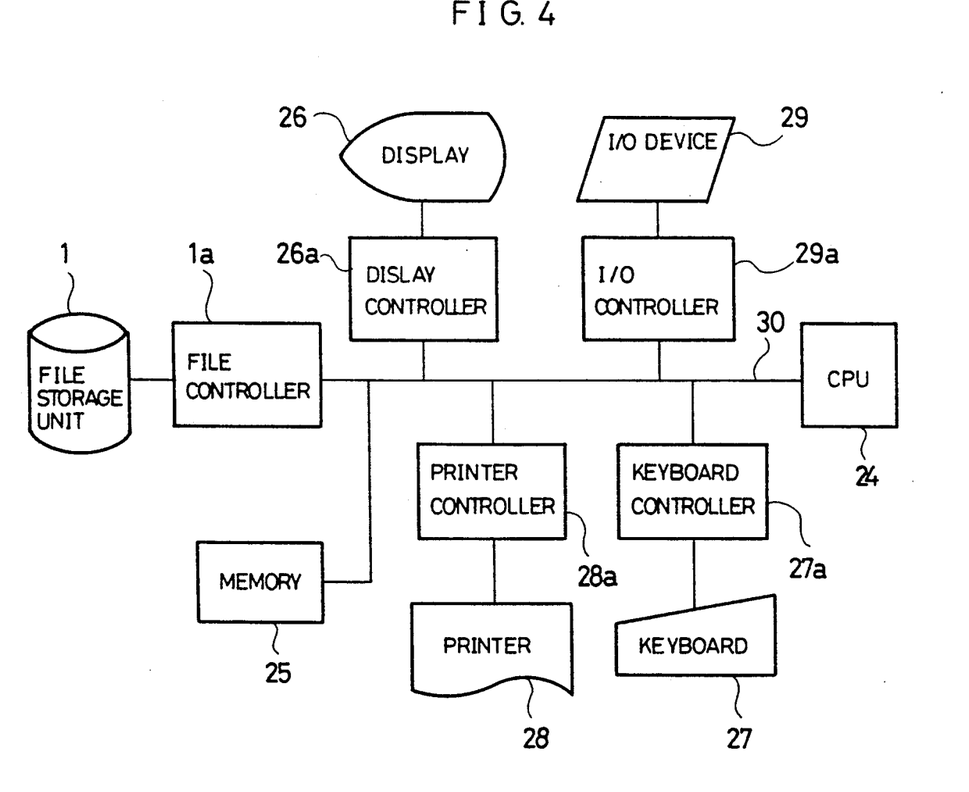
FIG. 4 is a block diagram showing the structure of a computer system.

FIG. 4 shows a commonly used, conventional computer system which includes a file storage unit 1 for storing executable programs, a file controller 1a for transmitting data between the file storage unit 1 and a system bus 30, a central processing unit (CPU) 24 for using the system bus 30 to perform predetermined operation and control, a memory unit 25 for storing program files from the file controller 1a, a display unit 26 for displaying the results executed by the system or input by the user, a display controller 26a for controlling the display unit 26 and feeding the data to be displayed to the display unit 26, a keyboard 27 for the user to key in system control data, a keyboard controller 27a for transmitting data from the keyboard 27 to the system bus 30, a printer 28 for outputting the executed results, a printer controller 28a for feeding data to the printer 28, an input/output device 29 for other inputs and outputs, and a input/output controller 29a for controlling the input/output device 29.

The operation of the conventional program starting system will be described with reference to FIG. 13. The step S6 is entry to a program preparation procedure. In the step S7, a source program is prepared. In the step S8, the source program is assembled into an object program. In the step S9, the program is linked. In the step S10, an executable program is completed. Alternatively, the executable program of the step S10 may be an off-the-shelf program 20a in the step S11.

This executable program is stored as a file in the file storage unit 1 of FIG. 14. In response to the user's instruction, the operating system 3 appends a header 5a to the program 4 and stores it in a program area of the memory map 2. Then, the operating system 3 sets relocation information of the program header 6 in the program body 7. Control of the execution is then transferred from the operating system 3 to the execution starting address of the program, thereby starting the program body 7.

In the above program starting system, however, has some problems. For example, when another program is located at the fixed address which is not an empty memory area, the existing program at the address is destroyed, thus presenting a hang-up problem with which the computer stops in an unexpected process step.

SUMMARY OF THE INVENTION

Accordingly, it is an object of the invention to provide a program starting system which is free from the above hang-up problem.

According to the invention there is provided a program starting system by which after an executable program is stored (located) in the memory, another executable program is assured to be stored (located) in the memory at an address of an empty memory area, thus preventing destruction of the existing program and occurrence of the computer hang-up problem.

According to an embodiment of the invention, a relocator (4a) is appended to an executable program (4) for checking program information and the size of a memory area in the memory (25). This program (4) is then stored in the file storage unit (1) as a file. When the user starts the CPU (24) with the keyboard (27), the file is stored in the memory (25) as a program. Where another executable program (9) is stored in the memory (25) at the fixed address under these conditions, the relocator-appended executable program (4) is relocated and restored at the address which is specified by the information of the relocator (4a) and, then, the other executable program (9) is stored in the fixed address.

First, a relocator (4a) is appended to an executable program (4), which is stored in the file storage unit (1) as a file. When the user starts the CPU (24) with the keyboard (27), the program (4) is stored in the memory (25). When the user specifies the program (4) under these conditions, the relocator (4a) specifies a restorage address of the memory (25) to store the program (4) at the restorage address. Then, another executable program (9) is stored in the memory (25) at the fixed address. Thus, the program (4) is restored in the memory (25) without being destroyed while the other program (9) is stored in the memory (25) at the fixed address.

Other objects, features, and advantages of the invention will be apparent from the following description taken in conjunction with the accompanying drawings.

DESCRIPTION OF THE PREFERRED EMBODIMENT

The organization of a computer system for which a program starting system of the invention is useful, is shown in FIG. 4.

Figure 1:
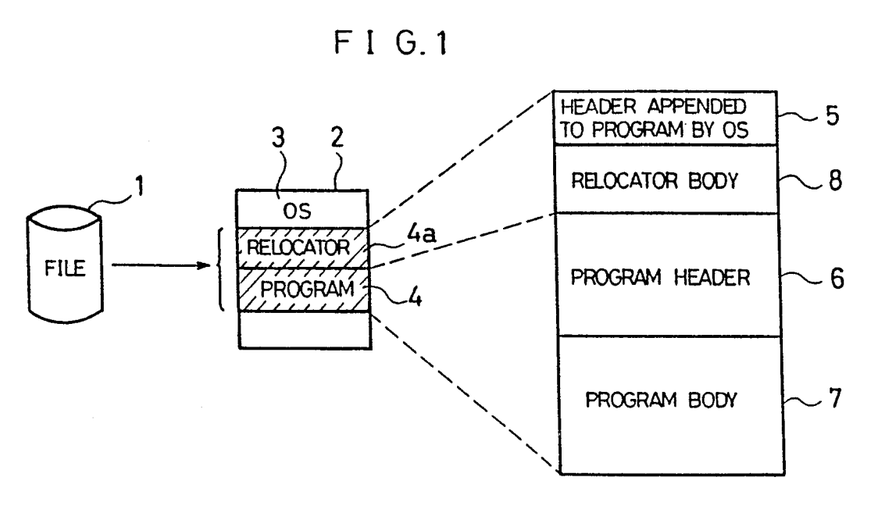
FIG. 1 is a block diagram showing a program starting system with which no program is relocatable.

FIG. 1 shows a program starting system in which programs are not relocatable. Like reference numerals designate like or corresponding parts of FIG. 14 and their description will be omitted. The memory map 2 further includes a relocator 4a for relocating (restoring) the executable program and checking the memory size and the information transferred to the program body 7 by the user. The relocator 4a consists of a relocator body 8 and a header 5 appended by the operating system when a file is loaded in the memory.

Figure 2:
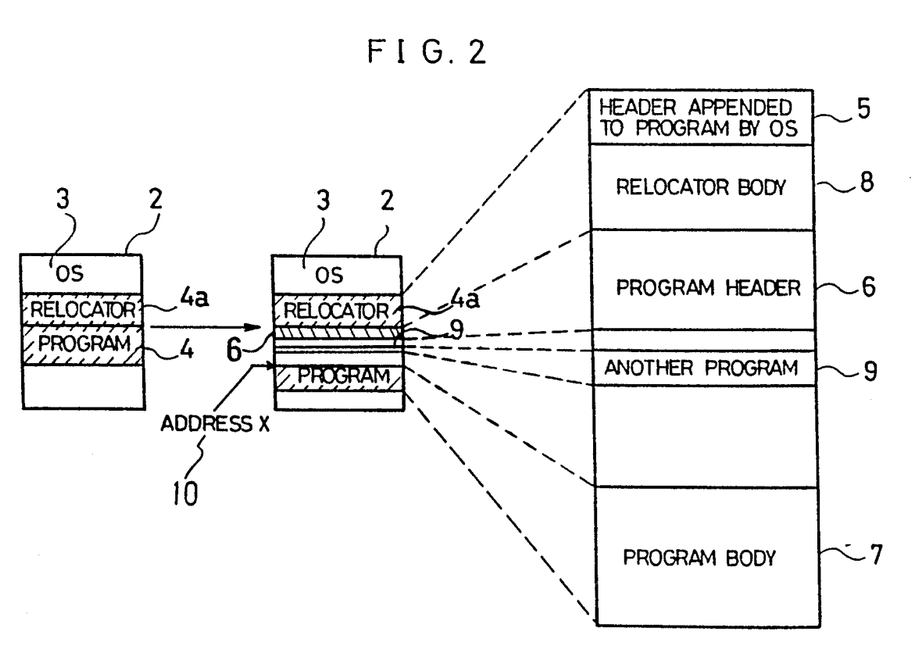
FIG. 2 is a block diagram showing a program starting system with which a program is relocatable according to the invention.

FIG. 2 shows a program starting system in which programs are relocatable according to the invention. Like reference numerals indicate like or corresponding parts of FIG. 1 and their description will be omitted. The memory map 2 further includes another executable program 9 present at a fixed address subsequent to the address at which the executable program is relocated by the relocator 4a. The address of the program body 4 is fixed.

Figure 3:
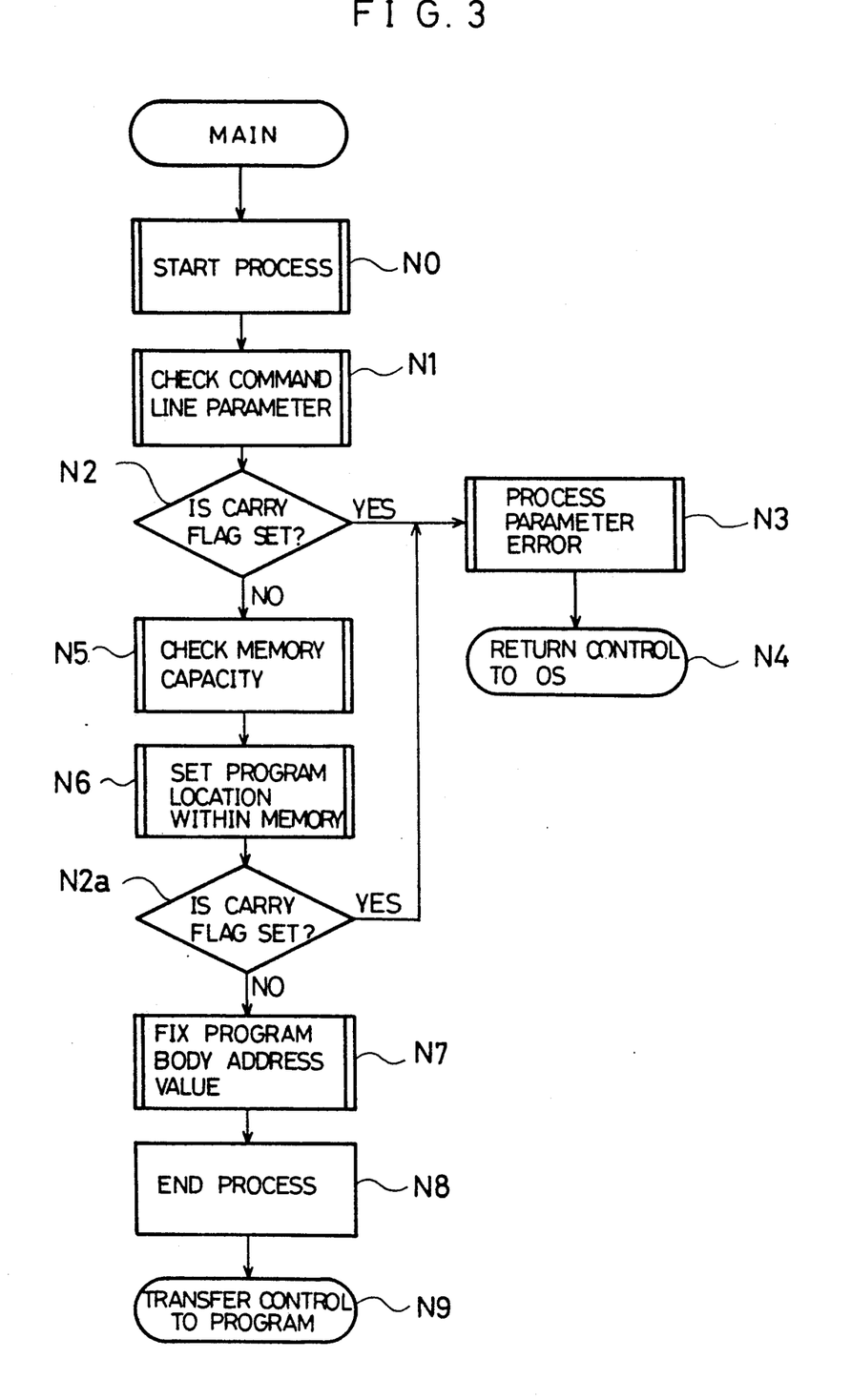
FIG. 3 is a flowchart showing the operation of the program starting system of FIG. 1 and FIG. 2.

FIG. 3 is a flowchart showing execution of the relocator. The subroutine of the step N1 is shown in more detail in FIG. 5. The subroutine of the step N3 is shown in more detail in FIG. 6. The subroutine of the step N5 is shown in more detail in FIG. 7. The subroutine of the step N6 is shown in more detail in FIG. 8. The subroutine of the step N7 is shown in more detail in FIG. 9. The respective processes in the steps N0, N8 and N9 are shown in more detail in FIGS. 10(a), 10(b), and 10(c). The command line and the header information are shown in FIG. 11. Available tables and registers, and the program header are shown in FIGS. 12(a), 12(b) and 12(c), respectively.

FIG. 11 shows a command line 31 on the display, which consists of a prompt output by the operating system and a command line specified by the user, and a parameter information 32 of the header 5 before modification by the subroutine in the step N1, and a parameter information 33 of the header 5 after modification by the subroutine in the step N1.

FIGS. 12(a), 12(b) and 12(c) show the tables 34 within the relocator, the registers 35 available for the relocator within the CPU 24, and the program header information 36, respectively.

The operation of a program starting system according to this embodiment will now be described. As a preparation for executing a program, the preparation of a relocator begins with the step S1 of FIG. 13. In the step S2, a source program is made. In the step S3, the source program is assembled into an object program. In the step S4, the program is linked. In the step S5, a relocator 4a is completed.

Then, the preparation of a program begins with the step S6. In the step S7, a source program is made. In the step S8, the source program is assembled into an object program. In the step S9, the program is linked. In the step S10, an executable program 4 is completed. This executable program may be an off-the-shelf program 20a.

In the step S12, the relocator 4a of the step S5 is appended to the executable program 4 of the step S10. In the step S13, a relocator-appended executable program 4 is completed. Then, the executable program 4 prepared in the steps S6–S10 is appended to the relocator 4a prepared in the steps S1–S5 in the step S12 to form a single executable program 4. This program is stored as a file in the file storage unit 1 of FIG. 1. In response to the user's instruction, the operating system 3 starts operation to append a header 5 to the relocator-appended executable program 4 and store it in an area of the memory map 2. Then, control of the execution is transferred to the relocator body 8. These processes are carried out by the CPU 24.

Now, reference is made to FIG. 3 to explain the operation of the main routine. The initial process of step N0 is shown in more detail in FIG. 10(a). That is to say, a stack is taken into the relocator by changing the value of a stack register. Then, the values of respective tables in the relocator are cleared to zero except for the error message character string table.

In the step N1, a subroutine is called for checking the parameters of a command line or converting into address values the character string data for the start address information specified by the user. In the step N2, a parameter error is tested with the flag information from the step N1.

If the carry flag has been set, the parameter error process subroutine is called in the step N3. In the step N4, control is transferred to the operating system 3. If no carry flag has been set, a memory capacity check subroutine is called in the step N5 to check the memory size in which the program is operable. In the step N6 for setting a location of the program within the memory, a subroutine is called for developing the program into the location of the start address information specified by the user.

In the step N2a, the same process as in the step N2 is carried out. In the step N7 for fixing the address value of the program body 7, a subroutine is called for setting the same number of locations, at which the address values of the program body 7 are not determined, as the number of relocation items. The end process in the step N8 is shown in more detail in FIG. 10(b). The table value for the stack address of the program set by the subroutine of step N7 is stored in the register to transfer the stack to the program. The top address of the header 5 is stored in each pointer register which have been changed by the subroutine in the step N1.

Figure 10:
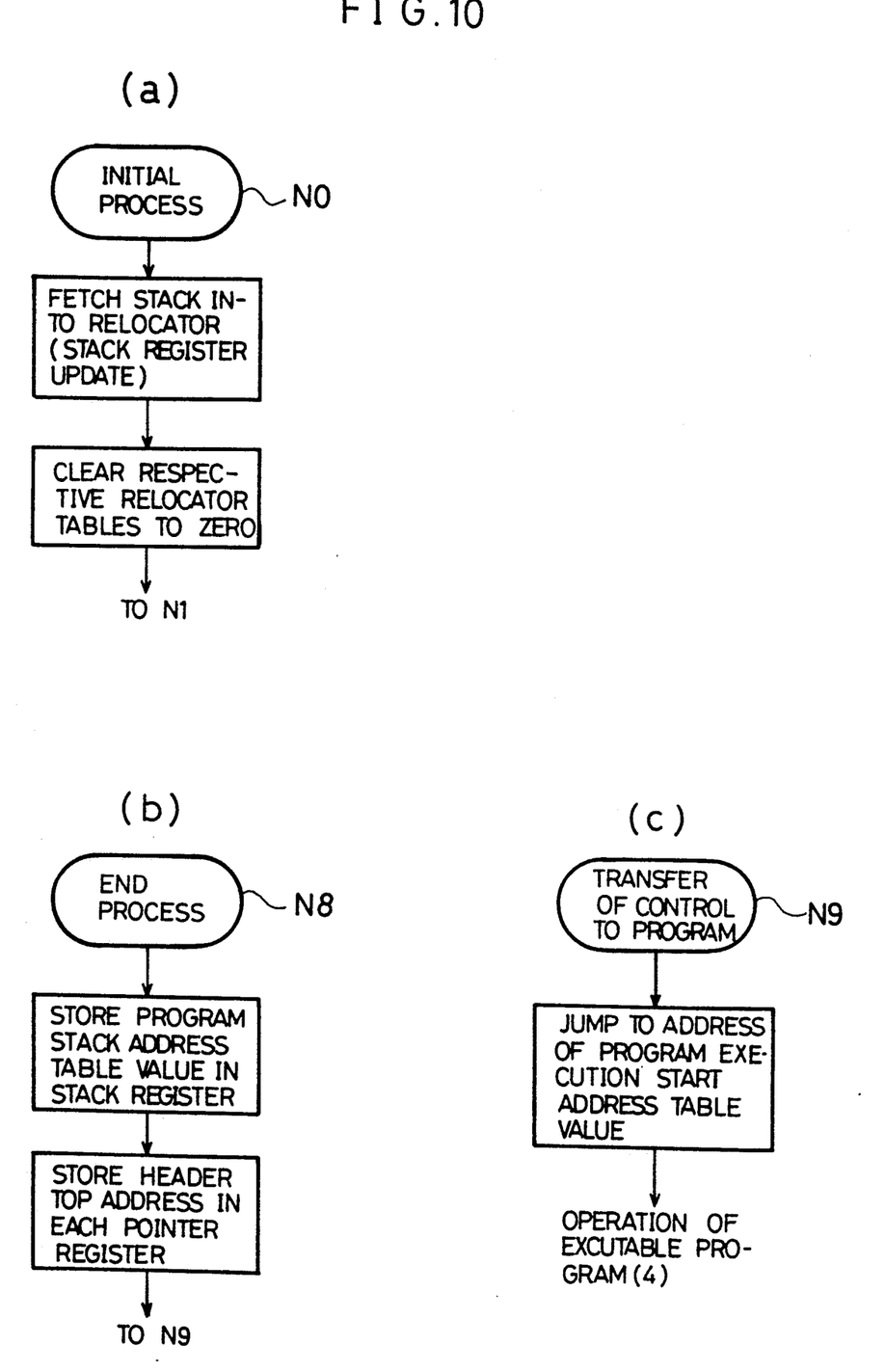
FIGS. 10(a), 10(b) and 10(c) are flowcharts showing processes in the respective steps N0, N8 and N9 of FIG. 3.
Figure 11:
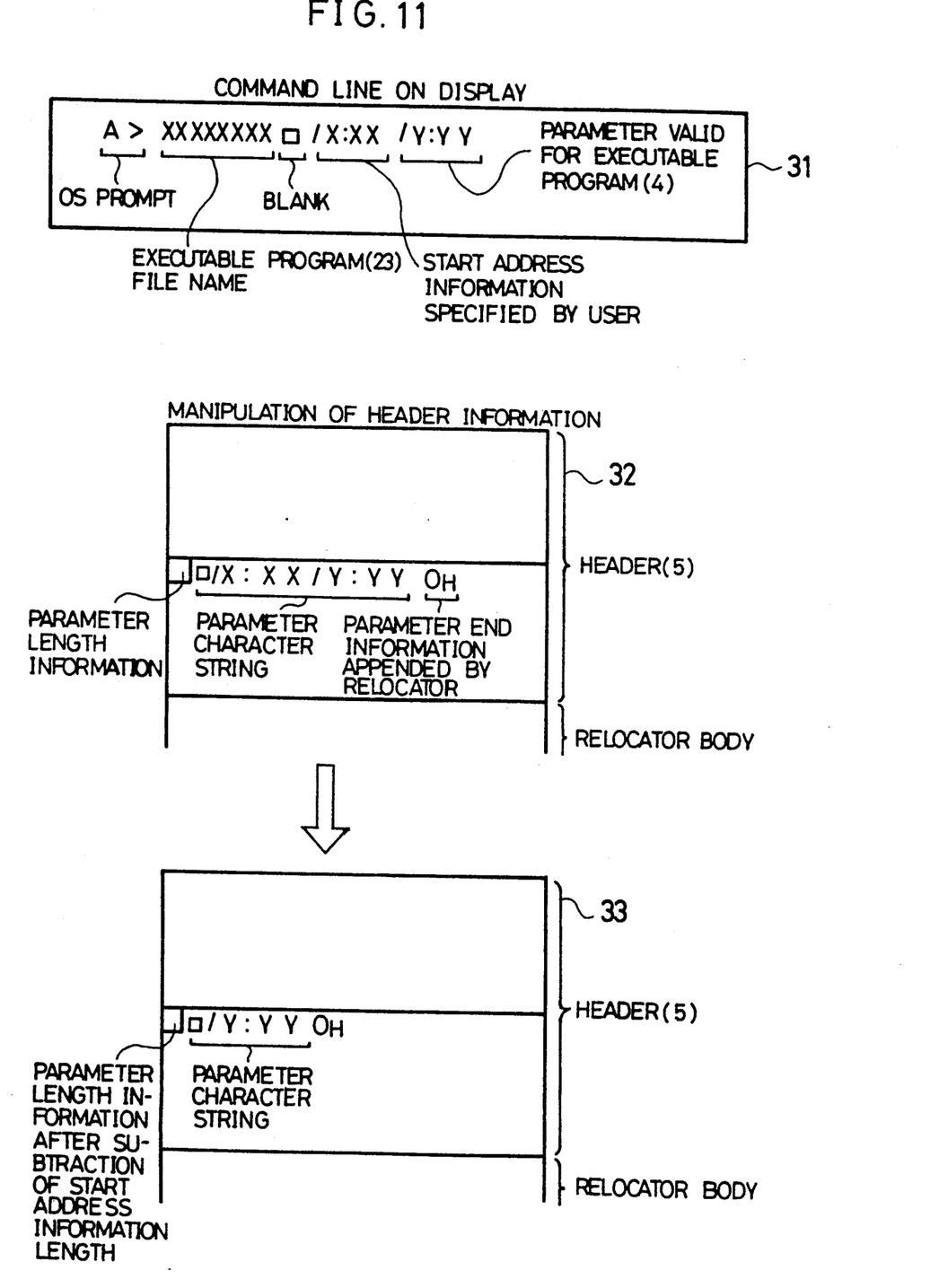
FIG. 11 shows a command line and operations within the header of the above embodiment.

In the step N9, as shown in more detail in FIG. 10(c), the program jumps to the program execution start address set by the subroutine of step N7 to transfer control to the program, thus completing the relocation process.

Figure 5:
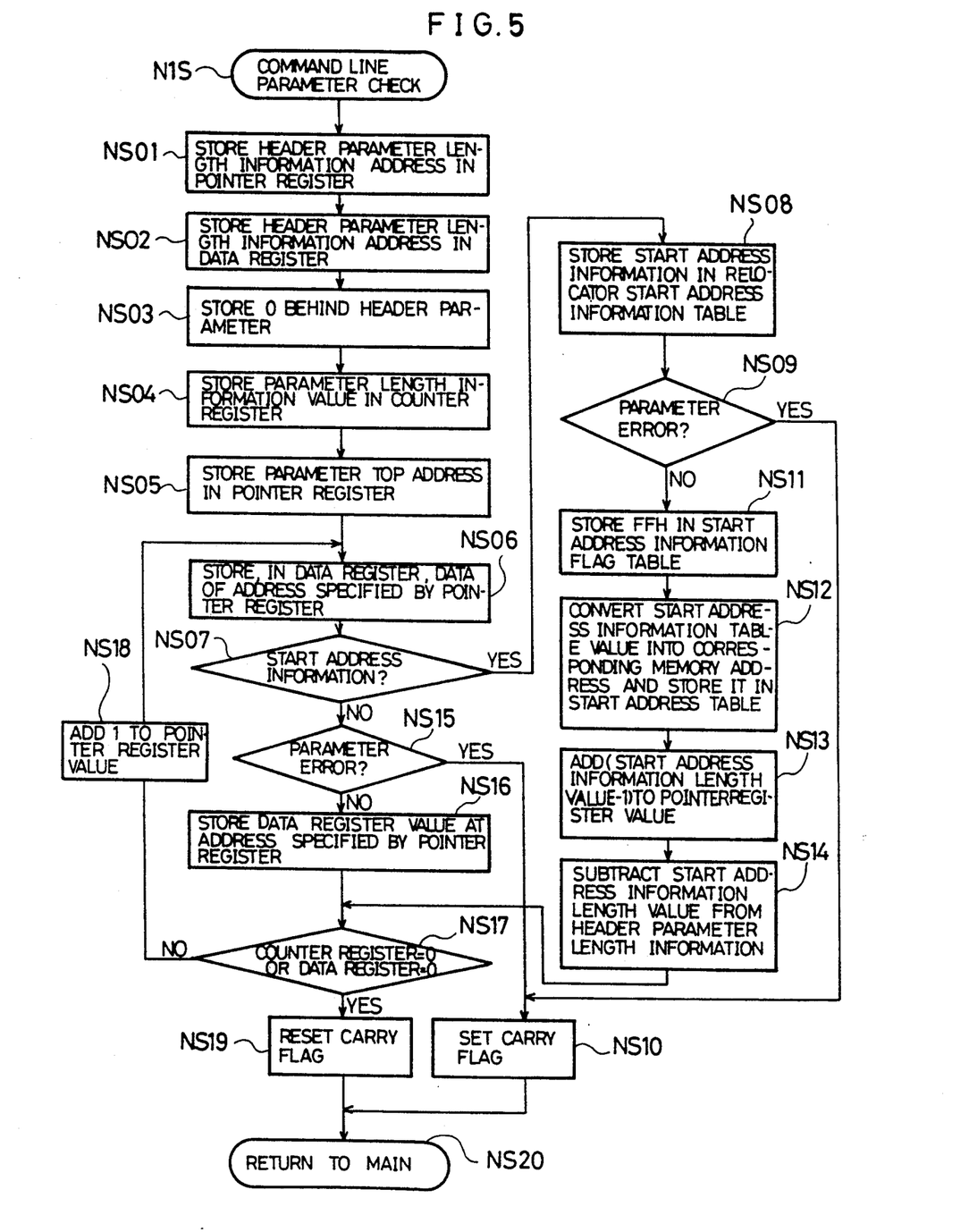
FIG. 5 is a flowchart showing a subroutine in the step N1 of FIG. 3.

FIG. 5 shows the subroutine for checking the parameters in the command line of step N1 in FIG. 3. Since the parameter and the information length of the command line specified by the user, except for the file name of an executable program 23 on the display 31 of FIG. 11, are set in the header 5 of FIG. 11, the address value of parameter length information of the header 5 is stored in the pointer register in the step NS01. In the step NS02, the parameter length information in the header 5 is stored in the data register. In the step NS03, zero data is stored as end information at the address equal to (the pointer register value+data register value+1). In the step NS04, the value of the parameter length information is stored in the counter register. In the step NS05, the first address of the parameter is stored in the pointer register. In the step NS06, the date at the address specified by the pointer register is stored in the date register. In the step NS07, the value of the data register is tested to see whether it is the start address information.

If it is the start address information, it is stored in the start address information table 34 in FIG. 12(a) in the step NS08. If there is any error found in the parameter of the start address information in the step NS09, a carry flag is set in the step NS10, thus returning to the main routine in the step NS20.

If there is no error, an FFH (hexadecimal) is stored in the step NS11 in the start address information flag table at 34 in FIG. 12(a). In the step NS12, the value of the start address information table is converted into the corresponding address value in the memory 25 and stored in the start address table at 34 in FIG. 12(a). In the step NS13, a value of (the start address length information value−1) is added to the value of the pointer register. In the step NS14, the value of the start address information length is subtracted from the parameter length information of the header 5, and control is transferred to the step NS17.

If it is not the start address information in the step NS07, another parameter is tested to see whether there is an error in the step NS15. If there is an error, control is transferred to the step NS10, while if there is no error, the value of the data register is stored at the address specified by the pointer register in the step NS16. In the step NS17, the counter register=0 or the data register=0 is tested. If it is not true, 1 is added to the value of the pointer register in the step NS18, and control is transferred to the step NS06. If it is true in the step NS17, a carry flag is reset in the step NS19, and control is transferred to the step NS20, thus returning to the main routine of FIG. 3. This changes the header information from the condition 32 to the condition 33 in FIG. 11, thus leaving only the necessary information in the executable program 4.

Figures 6, 7:
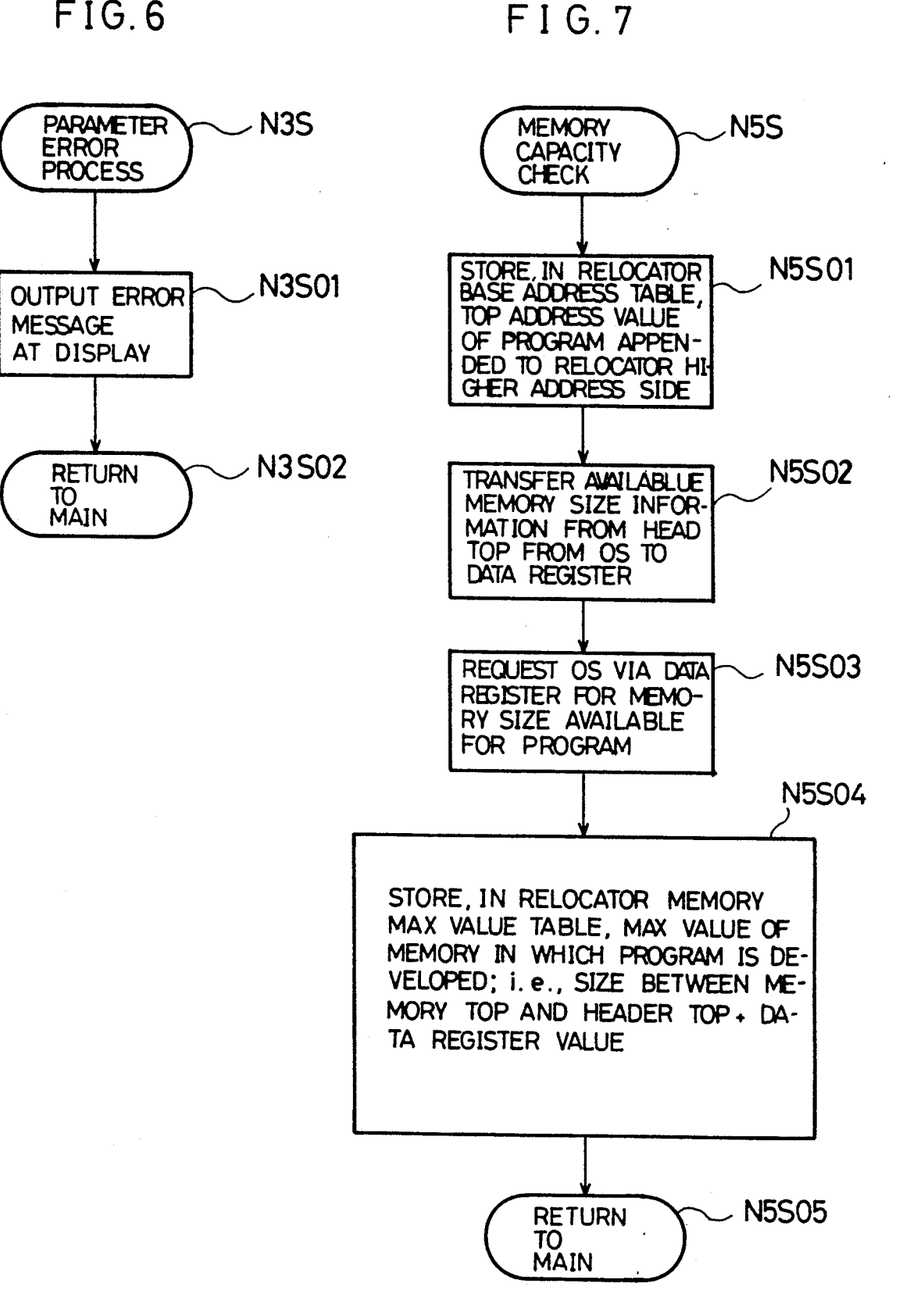
FIG. 6 is a flowchart showing a subroutine in the step N3 of FIG. 3.
FIG. 7 is a flowchart showing a subroutine in the step N5 of FIG. 3.

FIG. 6 shows the subroutine for processing a parameter error in the step N3 of FIG. 3. In the step N3S01, the operating system 3 outputs at the display 26 an error message character string out of the error message character string table at 34 of FIG. 12(a). In the step N3S02, operation is returned to the main routine.

FIG. 7 shows the subroutine for checking the memory capacity in the step N5 of FIG. 3. In the step N5S01, the first address value of the program body appended to the higher address side of the relocator 4a is stored in the base address table at 34 of FIG. 12(a). In the step N5S02, the information about the available memory size from the top of the header 5 is transferred from the operating system 3 to the data register. In the step N5S03, the memory size to be used by the program is requested to the operating system 3 via the data register. In the step N5S04, the size from the lowest address (phigical address value=0), of the memory 25 to the lowest address of the header 5 is added to the value of the data register which holds the data of the step N5S03, and the resulting value is stored in the maximum value table at 34. In the step N5S05, operation is returned to the main routine.

Figure 8:
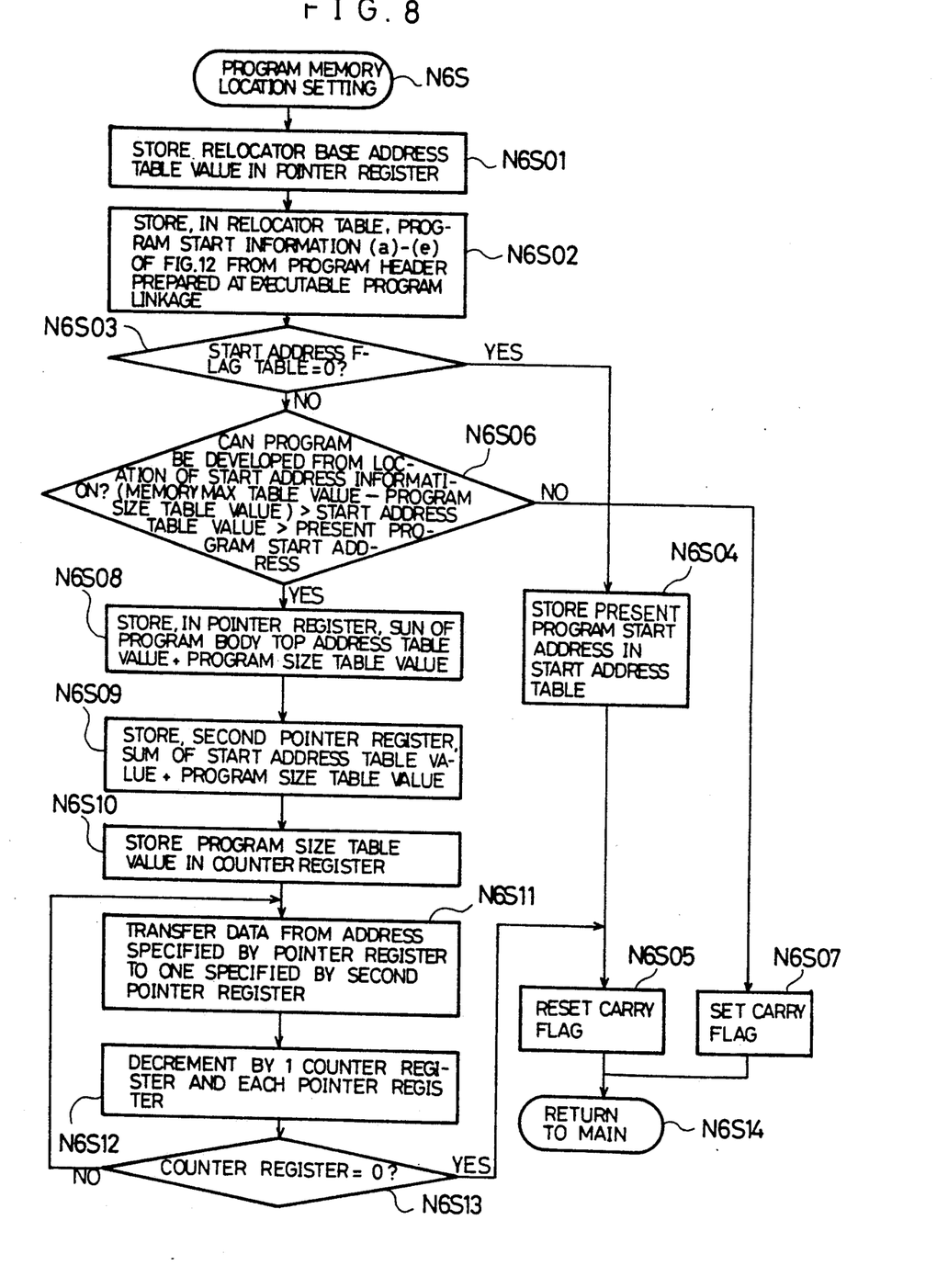
FIG. 8 is a flowchart showing a subroutine in the step N6 of FIG. 3.
Figure 12:
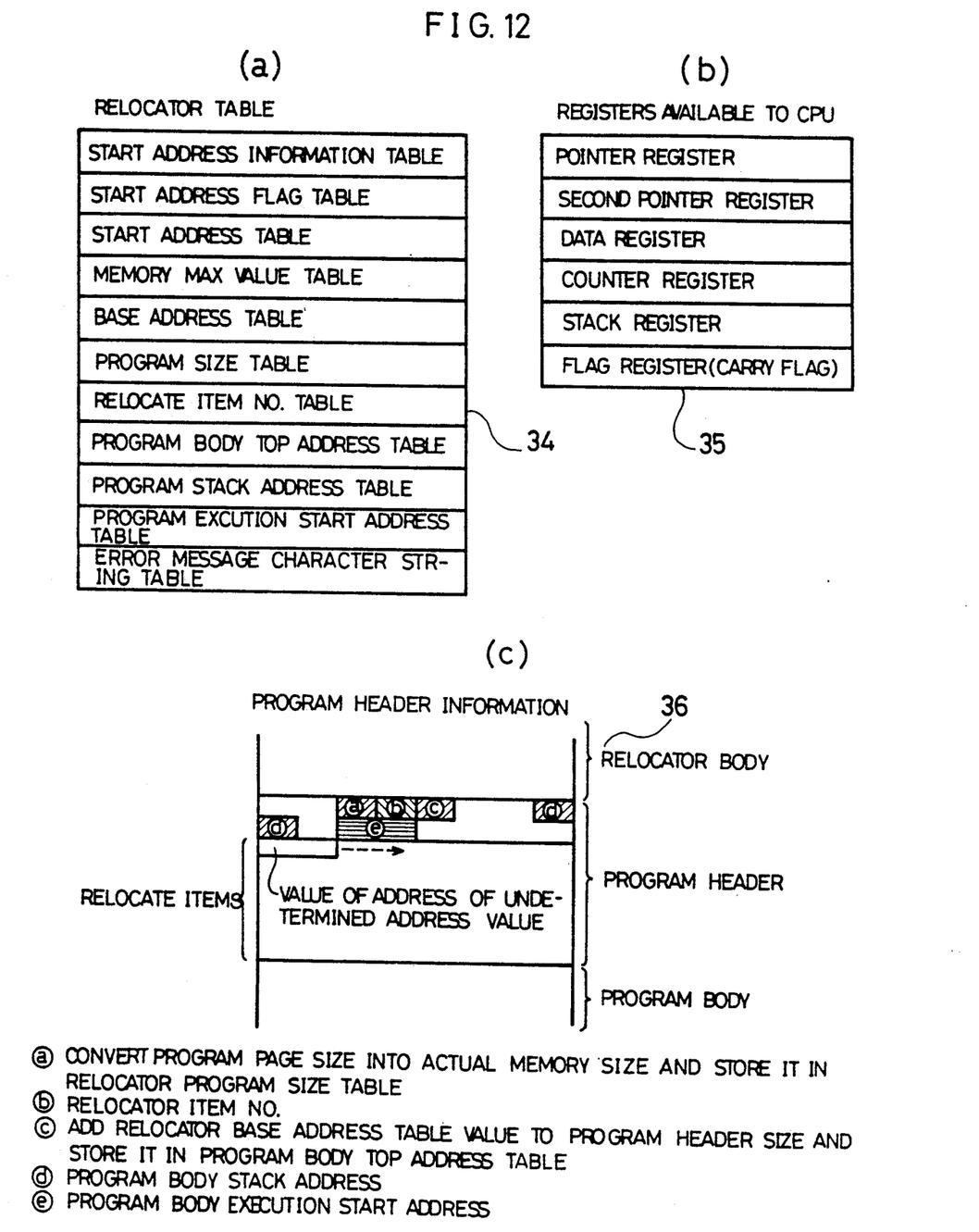
FIGS. 12(a), 12(b) and 12(c) show tables, registers, and programs available for the above embodiment.

FIG. 8 shows the subroutine for setting the location of a program within the memory in the step N6. In the step N6S01, the value of a base address table at 34 of FIG. 12 is stored in the pointer register. In the step N6S02, respective pieces of program starting information a through e in the header information 36 of FIG. 12(c) are stored in the respective tables 34 of FIG. 12(a). The program page size a is corrected to the actual size within the memory and stored in the program size table at 34, the program header size c is added to the value of the base address table at 34 and stored in the lowest address table of the program body. If the start address flag table at 34 is zero in the step N6S03, the present program start address is stored in the start address table at 34 in the step N6S04. In the step N6S05, a carry flag is reset, returning to the main routine of FIG. 3 in the step N6S14.

If the start address flag is not zero, control is transferred to the step N6S06. In the step N6S06, whether it is possible to develop the program from the location specified by the start address information is tested by finding whether the difference between the value of the memory maximum value table and the value of the program size table at 34 is greater than the value of the start address table at 34 or whether the value of the start address table at 34 is greater than the value of the present program start address. If it is found impossible, a carry flag is set in the step N6S07, returning to the main routine of FIG. 3 in the step N6S14.

If it is found possible, control is transferred to the step N6S08, where the value of the lowest address table of the program body at 34 is stored in the pointer register to add the value of the program size table at 34 to the pointer register. In the step N6S09, the value of the start address table at 34 is stored in the second pointer register to add the value of the program size table to the second pointer register. In the step N6S10, the value of the program size table at 32 is stored in the counter register. In the step N6S11, the data at the address specified by the pointer register is stored at the address specified by the second pointer register. In the step N6S12, the counter resister and the pointer register are decremented by one. In the step N6S13, if the counter register is not zero, control is transferred to the step N6S11, while if the counter register is zero, a carry flag is reset in the step N6S05, returning to the main routine of FIG. 3 in the step N6S14.

Figure 9:
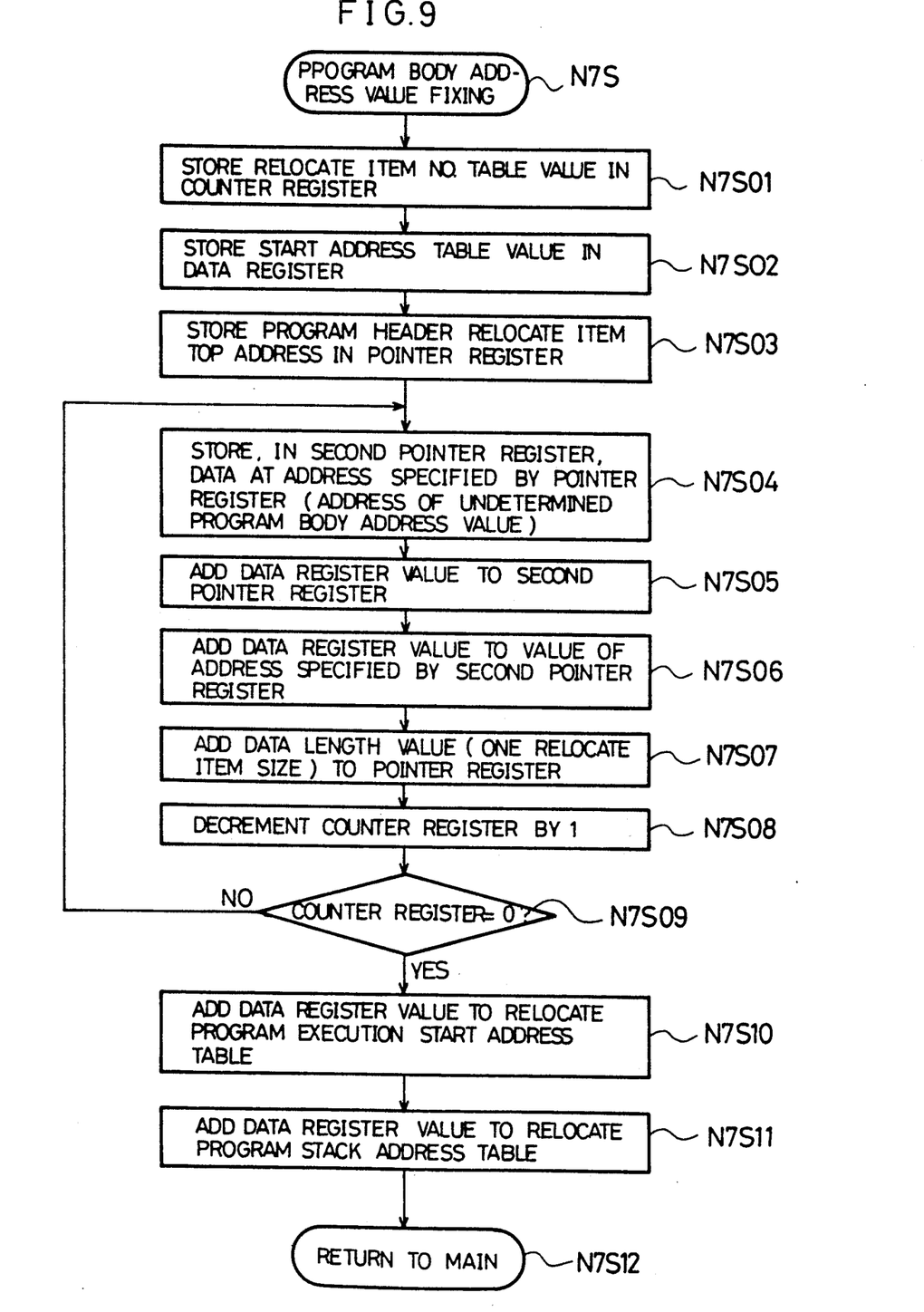
FIG. 9 is a flowchart showing a subroutine in the step N7 of FIG. 3.

FIG. 9 shows the subroutine for fixing the address value of the program body in the step N7 of FIG. 3. In the step N7S01, the value of the relocation item number table at 34 of FIG. 12(a) is stored in the counter register. In the step N7S02, the value of the start address table at 34 is stored in the data register. In the step N7S03, the lowest address of the relocation items in the program header at 36 of FIG. 12(c) is stored in the pointer register. In the step N7S04, the data at the address specified by the pointer register is stored in the second pointer register. In the step N7S05, the value of the data register is added to the second pointer register. In the step N7S06, the value of the data register is added to the value at the address specified by the second pointer register. In the step N7S07, the size of a single relocation item is added to the pointer register. In the step N7S08, the counter register is decremented by one.

If the counter register is not zero in the step N7S09, control is transferred to the step N7S04, while if the counter register is zero, control is transferred to the step N7S10. In the step N7S10, the value of the data register is added to the execution starting address table at 34 of FIG. 12(a). In the step N7S11, the value of the data register is added to the program stack address table at 34, returning the main routine of FIG. 3.

With the above process, when another executable program 9 is assigned to the fixed address of the memory 2 after the program body 7 is started, it is possible to continue execution without causing a hang-up. Other process items may be added to the process items of the relocator specified in the above embodiment. It is also possible to relocate the executable program in a default address if the user does not specify any parameter for the start address. Another program may be a collection of data.

According to the invention, where a relocator-appended executable program is stored in the memory before another executable program is stored at the fixed address, in response to the user's instruction for a restorage address, the relocator-appended executable program is restored at the restorage address while the other executable program is stored at the fixed address which is an empty memory area, thus preventing destruction of the original program and a hang-up of the computer system due to the program destruction.

While a preferred embodiment of the invention has been described using specific terms, such description is for illustrative purposes only, and it is to be understood that changes and variations may be made without departing from the spirit and scope of the invention as recited in the following claims.

What is claimed is:

1. A program loading method for use in a computer system which includes a file storage unit for storing an executable program as a file, a memory for storing as a program said file from said file storage unit, a keyboard for inputting information, and a central processing unit, said program loading method including the steps of storing as a file a prepared executable program in said file storage unit, starting said central processing unit by means of said keyboard to load said file in said memory as a program, reading said program from said memory for starting said program, wherein the improvement comprises the steps of:

appending to said executable program a relocator for checking program information and a memory area size in said memory to make a relocator-appended executable program;

storing as a relocator-appended file said relocator-appended executable program in said file storage unit; starting said central processing unit by means of said keyboard to load said relocator-appended file in said memory at a fixed address as a relocator-appended executable program;

specifying with said relocator a relocation address at which said relocator-appended executable program is to be relocated in said memory; and loading another executable program in said memory at said fixed address which causes said relocator-appended executable program to be relocated to said relocation address, whereby preventing destruction of said relocator-appended executable program.

2. The program loading method of claim 1, wherein said executable program is appended to a higher address side of said relocator to make said relocator an executable program on a information storing file.

3. The program loading method of claim 1, which further comprises the step of checking information input by the user to said executable program to prevent any incorrect information from being transferred to said executable program.

4. The program loading method of claim 1, which further comprises the step of comparing a value input by the user for specifying said relocation address with an existing empty memory area size of said memory to prevent relocation of said executable program in said memory when said input value exceeds said empty area size.

5. The program loading method of claim 1, wherein said specifying step comprises the steps of:

checking a command line parameter to see whether there is any error in a parameter of start address information;

checking a memory capacity of said memory;

setting a program location within said memory;

fixing an address value of a program body;

storing a value of a program stack address table in a stack register;

storing a highest address of a header in each pointer register; and jumping to an address in a program execution start address table, thereby completing a relocation process.

6. The program loading method of claim 5, wherein said memory checking step comprises the steps of:

storing a first address value of said program body appended to a higher address side of said relocator in a base address table;

transfer information about an available memory size from a highest address of a header to a data register;

requesting a memory size to be used by said program through a register;

adding a memory size between a lowest address of said memory and a lowest address of said header to a value of a data register; and storing a resulting value of said addition in a maximum value table.

7. The program loading method of claim 5, wherein said location setting step comprises the steps of;

storing a value of a base address table in a pointer register;

storing pieces of program starting information in respective tables;

translating a program page size into a physical size within said memory;

adding a program header size to a value of said base address table;

storing said program header size in a lowest address table of said program body;

storing a value of said lowest address table in a pointer register to add a value of a program size table to said pointer register;

storing a value of said program execution start address table in a second pointer register to add said value of said program size table to said second pointer register;

storing a value of said program size table in a counter register; and decrementing said counter register and said pointer register by one.

8. The loading method of claim 5, wherein said fixing step comprises the steps of:

storing a value of a relocation item number table in a counter register;

storing a value of said start address table in a data register;

storing a lowest address of a relocation item in said program header in said pointer register;

storing data at an address specified by said pointer register in a second pointer register;

adding a value of said data register to said second pointer register;

adding a value of said data register to a value at an address specified by said second pointer register;

adding a memory size of a single relocation item to said pointer register;

decrementing said counter register by one;

adding a value of said data register to said execution starting address table; and adding a value of said data register to said program stack address table, thereby returning control to a main routine.

* * * * *